United States Patent [19]

Nishimura et al.

[11] 4,257,770
[45] Mar. 24, 1981

[54] DISAZO DYE COMPOSITION

[75] Inventors: Nobuzi Nishimura, Toyonaka; Masayuki Tsuji, Kobe; Seizo Konishi, Minoo; Tadashi Yamamoto, Toyonaka; Takemi Tokieda, Nara; Utazi Sawa, Nara; Suketsugu Koumura, Hirakata, all of Japan

[73] Assignee: Sumitomo Chemical Company, Limited, Osaka, Japan

[21] Appl. No.: 57,818

[22] Filed: Jul. 16, 1979

[30] Foreign Application Priority Data

Jul. 21, 1978 [JP] Japan .................. 53-89715

[51] Int. Cl.$^3$ .................. C09B 62/00; C09B 27/00
[52] U.S. Cl. .................. 8/549; 8/641; 8/681; 8/918; 260/185
[58] Field of Search .................. 8/1 P, 26, 54.2, 41 R, 8/549, 641, 918

[56] References Cited

U.S. PATENT DOCUMENTS 3,114,754  12/1963  Lodge et al. .................. 260/372

FOREIGN PATENT DOCUMENTS 42-16617  9/1967  Japan .

OTHER PUBLICATIONS

Vewkataraman, K, "The Chemistry of Synthetic Dyes", vol. VI, Academic Press, 1972, pp. 36-37; 46; 49; 50-51;259.
Colour Index, vol. 3, (Third Edition), C. I. Reactive Black 5, pp. 3, 5, 48.

Primary Examiner—A. Lionel Clingman

Attorney, Agent, or Firm—Stevens, Davis, Miller & Mosher

[57] ABSTRACT

A dye composition comprising at least one disazo dye of the formula (I) expressed in the form of a free acid,

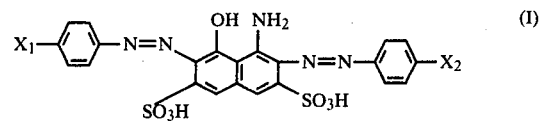

wherein each $X_1$ and $X_2$ is $-SO_2CH_2CH_2OCOCH_3$, $-SO_2CH_2CH_2OSO_3H$ or $-SO_2CH=CH_2$, provided that at least one of $X_1$ and $X_2$ is $-SO_2CH_2CH_2OCOCH_3$, and at least one disazo dye of the formula (II) expressed in the form of a free acid,

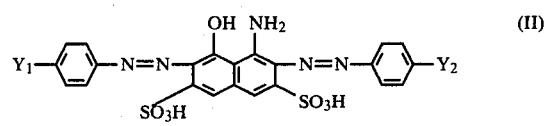

Wherein each $Y_1$ and $Y_2$ is $-SO_2CH_2CH_2OSO_3H$, $-SO_2CH=CH_2$ or $-SO_2CH_2CH_2OH$, provided that one of $Y_1$ and $Y_2$ is $-SO_2CH_2CH_2OSO_3H$ or $-SO_2CH=CH_2$, is produced by diazotizing a mixture of 4-aminophenyl-β-sulfatoethylsulfone and 4-aminophenyl-βacetoxyethylsulfone in a weight ratio of 30 to 70: 70 to 30 with a nitrite, and coupling the resulting mixture of the diazonium salts with 1-amino-8-naphthol-3,6-disulfonic acid. The dye composition is suitable for dyeing natural or regenerated cellulosic fiber materials in black.

12 Claims, No Drawings

DISAZO DYE COMPOSITION

The present invention relates to disazo dye compositions and production thereof. More particularly, it relates to disazo dye compositions of excellent performance and a process for producing them in an industrially advantageous manner.

A black dye produced by coupling diazotized 4-aminophenyl-β-sulfatoethylsulfone with 1-amino-8-naphthol-3,6-disulfonic acid is well known as C.I. Reactive Black 5 in the Colour Index.

In the well-known process for producing this black dye, the synthesis of 4-aminophenyl-β-sulfatoethylsulfone is so troublesome that the process is unsatisfactory commercially.

Conventionally, 4-aminophenyl-β-sulfatoethylsulfone is produced (1) by hydrolyzing 4-acetylaminophenyl-β-hydroxyethylsulfone in a dilute inorganic acid, isolating the resulting hydrolyzed product and converting the product to its sulfato ester with a conc. sulfuric acid; (2) by hydrolyzing the acetylamino group of 4-acetylaminophenyl-β-hydroxyethylsulfone in a conc. sulfuric acid and converting the hydrolyzed product and the by-product (4-aminophenyl-β-acetoxyethylsulfone to its sulfato ester with addition of a fuming sulfuric acid; or (3) by converting 4-acetylaminophenyl-β-hydroxyethylsulfone to its sulfato ester and hydrolyzing the acetylamino group in a dilute sulfuric acid.

But, each of these well-known processes is troublesome in operation and requires large amounts of sulfuric acid or fuming sulfuric acid. Consequently, many operations, for example, removal of sulfuric acid and treatment of waste including waste acid, are required so that a lowering in the yield of the product could not be avoided.

As a result of a study to overcome these drawbacks, the inventors attained the present invention.

The present invention provides a dye composition comprising at least one disazo dye of the formula (I) expressed in the form of a free acid,

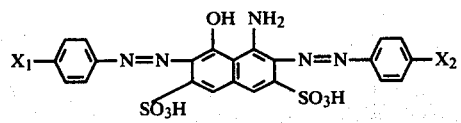

wherein each $X_1$ and $X_2$ is $-SO_2CH_2CH_2OCOCH_3$, $-SO_2CH_2CH_2OSO_3H$ or $-SO_2CH=CH_2$, provided that at least one of $X_1$ and $X_2$ is $-SO_2CH_2CH_2OCOCH_3$, and at least one disazo dye of the formula (II) expressed in the form of a free acid,

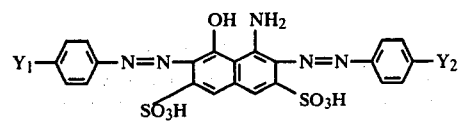

wherein each $Y_1$ and $Y_2$ is $-SO_2CH_2CH_2OSO_3H$, $-SO_2CH=CH_2$ or $-SO_2CH_2CH_2OH$, provided that one of $Y_1$ and $Y_2$ is $-SO_2CH_2CH_2OSO_3H$ or $-SO_2CH=CH_2$, and also provides a process for producing said dye composition, which comprises diazotizing a mixture of 4-aminophenyl-β-sulfatoethylsulfone and 4-aminophenyl-β-acetoxyethylsulfone in a weight ratio of 30 to 70:70 to 30 with a nitrite, and coupling the resulting mixture of the diazonium salts with 1-amino-8-naphthol-3,6-disufonic acid, and further provides a process for producing said dye composition, which comprises heating 4-acetylaminophenyl-β-hydroxyethylsulfone at a temperature of 80° to 130° C. in a concentrated sulfuric acid to obtain a mixture of 4-aminophenyl-β-sulfatoethylsulfone and 4-aminophenyl-β-acetoxyethylsulfone in a weight ratio of 30 to 70:70 to 30, the amount of sulfuric acid being 2.4 to 3.8 moles per mole of 4-acetylaminophenyl-β-hydroxyethylsulfone, diazotizing the mixture with a nitrite, and coupling the resulting mixture of the diazonium salts with 1-amino-8-naphthol-3,6-disulfonic acid.

Immediately after completion of the coupling, the resulting product (coupling reaction mixture) comprises 5 to 50% by weight each of the compounds of the formulae (1), (2), (3) and (4) expressed in the form of a free acid:

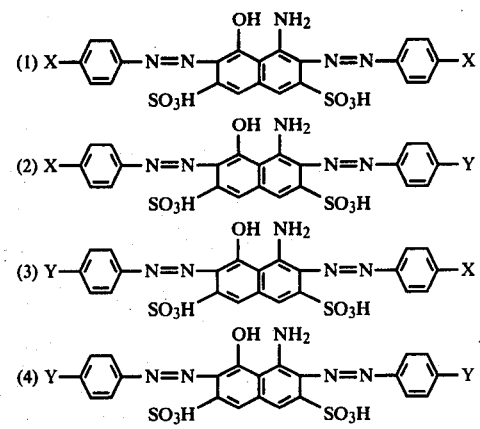

wherein X is $-SO_2CH_2CH_2OSO_3H$ and Y is $-SO_2CH_2CH_2OCOCH_3$. But it changes to the foregoing dye composition comprising the component dyes (I) and (II), in the course of successive concentration and/or drying of the coupling reaction mixture.

The content of each is the component dyes (I) and (II) varies depending on the reaction conditions, but generally is within a range of 20 to 80% by weight, usually 30 to 70% by weight. The component dye (I) is a novel one which is not substantially described in the literature, and the other dye (II) has been produced by a known method.

The characteristic feature of the present invention is to provide an advantageous process for the production of said dye composition. That is, according to the present process, the hydrolysis and esterification of 4-acetylaminophenyl-β-hydroxyethylsulfone, can be achieved with a little sulfuric acid, so that great advantage is obtained in the subsequent step wherein the reaction mixture is processed into a final product. In the process of the present invention, sulfuric acid in an amount of 2.4 to 3.8 times by mole based on the starting material is sufficient, and this amount is considerably smaller than that used in a conventional method. Consequently, the neutralization of an excess of sulfuric acid after completion of the reaction, and separation of sodium sulfate by-produced can be reduced. According to the present invention, all the operations, that is, hydrolysis and esterification of 4-acetylaminophenyl-β-hydroxyethylsulfone with sulfuric acid and dye processing can be carried out in one step without intermediate isolation and filtration. Further, the final product having a sufficient dyeing affinity can be produced by merely drying the dye-containing reaction mixture. Besides, the progress of reaction is also very smooth, and there is obtained the advantage that the yield of dye is markedly improved as compared with a conventional method.

Another characteristic feature of the present invention is that the dye composition of the present invention is superior in dyeing performances (e.g. solubility, dyeing power, build-up property) to the dye of the formula (II) alone. The dye composition of the present invention shows the following performances when used for dyeing natural or regenerated cellulosic fibers.

1. Dip dyeing

The amount of dye fixed on mercerized cotton yarn increases linearly between 1% and 4% (o.w.f.).

2. One-phase printing

The stability of colour paste is kept good even when 2.0% (o.w.p.) of sodium hydrogen carbonate is added to a colour paste of 4.0% (o.w.p.). Further, combination dyeing with monochlorotriazine series dyes is possible according to this printing method.

3. Two-phase printing

In the blotch printing of mercerized cotton cloth with Fixer RC (alkali agent), the build-up property increases linearly between 1% and 11% (o.w.p.). The dyeability is also excellent, and it shows a rapid increase particularly in printing bemberg cloth and reaches dyeing equilibrium at about 2.5% (o.w.p.), producing a black colour. Also, the fixation percentage keeps a constant value of 94% (cotton cloth) regardless of dyeing concentration.

4. Two-bath padding process and batch-up dyeing

The same dyeing performances as in dip dyeing are obtained also in these dyeing methods.

The known dye having a formula similar to the formula (I) in the present invention is disclosed in Example 61 of U.S. Pat. No. 3,114,754. It is noteworthy that the dye composition of the present invention is remarkably superior to said known dye.

Next, the process of the present invention will be illustrated in more detail.

As 4-acetylaminophenyl-$\beta$-hydroxyethylsulfone, a starting material for the production of 4-aminophenyl-$\beta$-sulfato(and $\beta$-acetoxy)ethylsulfones in the first reaction (hydrolysis and esterification) of the process, one having a purity of 96 to 100% (on the dry basis) is used. The concentrated sulfuric acid used in the present process includes 90 to 102% sulfuric acid, preferably 95 to 100% sulfuric acid. The amount of sulfuric acid used is 2.4 to 3.8 moles, preferably 2.85 to 3.25 moles per mole of said starting material.

The reaction is carried out at a temperature of 80° to 130° C., preferably 95° to 115° C., with stirring. The total amount of 4-aminophenyl-$\beta$-sulfato(and $\beta$-acetoxy)ethylsulfones produced reaches 80 to 100% of the theoretical value. The content of the $\beta$-acetoxy compound is within a range of 30 to 70% by weight, the balance being $\beta$-sulfato compound. The reaction can be followed for example by chromatography, and the highest yield is obtained in 1 to 10 hours.

In the second reaction (diazotization) of the process of the present invention, the resulting mixture of 4-aminophenyl-$\beta$-sulfato(and axetoxy)ethylsulfones is diazotized with a nitrite at a relatively low temperature (about 0° to 20° C.) in an acidic medium. As the nitrite, alkali metal nitrites, particularly sodium nitrite is preferred. In this case, there may be applied a usual diazotization in which a nitrite is added in portions to an acidic medium containing the amine, as well as a reverse diazotization in which the amine is dissolved by neutralization and mixed with the nitrite, and then the resulting solution is added to an acidic medium. The acid used includes usual inorganic acids such as sulfuric acid and hydrochloric acid.

1-Amino-8-naphthol-3,6-disulfonic acid (hereinafter referred to as H acid), a coupling component, is used as a free acid or its alkali metal salt in the form of an aqueous solution. The coupling of the mixture of the diazonium salts obtained (hereinafter referred to as diazotized mixture) with H acid is carried out at a relatively low temperature of $-10°$ to 40° C., preferably 0° to 20° C., in an aqueous medium. The coupling of the present invention is effected by first reacting one mole of the diazotized mixture with about one mole of H acid in a strongly acidic region (pH 0–4) and then mixing one mole of the fresh diazotized mixture with the first coupling mixture in a relatively high pH region (4–8). Alternatively, the coupling may be carried out by mixing two moles of the diazotized mixture and about one mole of the H acid from the first and neutralizing the mixture with an alkali stepwise or continuously thereby increasing the pH of the mixture to complete the two-stage coupling.

The alkali agent used for the neutralization in the coupling reaction includes, for example, hydroxides, oxides, carbonates, bicarbonates and phosphates of alkali metals or alkaline earth metals. It is particularly desirable to use sodium carbonate, sodium hydrogen carbonate or sodium hydroxide as a solid or aqueous solution. In this case, a local increase in pH should be avoided to prevent undesired coupling at the 7-position. The final pH value of coupling is preferably kept at 8 or less. Otherwise, the amount of the dye having $-SO_2CH_2CH_2OH$ as $Y_1$ or $Y_2$ in the formula (II) unfavorably increases.

The molar ratio of H acid to the diazotized mixture is within a range of 0.45 to 0.55.

The reaction mixture as produced by the coupling comprises four compounds of the formulae (1), (2), (3) and (4), as described hereinbefore. In addition to these compounds, it sometimes contains a small amount of monoazo dyes and dyes having a $\beta$-hydroxyethylsulfone or vinylsulfone group owing to the starting material and reaction conditions.

The present diazotization and coupling may be carried out in the presence of a surfactant, a hydrating agent such as urea, thiourea and ethylene glycol, and a base catalyst such as pyridine. Also, a known pH buffer may be used to protect the reactive groups.

The resulting aqueous dye solution is applied to dyeing as it is or after concentrated. The aqueous dye solution may be spray-dried to obtain a dry product. In some cases, the dye solution is filtered, with or without cooling, to remove inorganic salts, and the filtrate is treated as described above. The dye composition thus obtained comprises the component dyes of the formulae (I) and (II).

The present invention will be illustrated with reference to the following examples. All parts in the examples are by weight.

EXAMPLE 1

4-Acetylaminophenyl-$\beta$-hydroxyethylsulfone (24.8 parts; purity 98%) was added to 98% sulfuric acid (31 parts; its molar ratio to said ethylsulfone 3.1) at 60° to 70° C. with stirring, followed by stirring at 60° to 70° C. for 1 hour. The mixture was heated to 100° to 105° C. in 1 hour and kept at this temperature for 8 hours with stirring. After reaction was finished, the reaction mixture was analyzed for the weight ratio of 4-aminophenyl-$\beta$-sulfatoethylsulfone (hereinafter referred to as "sulfato compound" for brevity) to 4-aminophenyl-$\beta$-acetoxyethylsulfone (hereinafter referred to as "acetoxy compound" for brevity) by liquid chromatography. The result was as follows:

Sulfato compound 53

Acetoxy compound 47

The reaction mixture thus obtained was poured into ice water (100 parts), and sodium carbonate (14.3 parts) was added thereto. Sodium nitrite (20.7 parts as 35% aqueous solution) was added at 0° to 5° C., followed by stirring at 5° to 10° C. for a further 2 hours. An excess of sodium nitrite was decomposed by adding sulfamic acid (0.4 part) to obtain a diazo liquor. Separately from this, the monosodium salt of 1-amino-8-naphthol-3,6-disulfonic acid (20.6 parts; purity 75% molecular weight 319) was dissolved in water (90 parts) using sodium carbonate (4.8 parts) to obtain a coupler liquor. The resulting coupler liquor was added to the above diazo liquor over 30 minutes. After adding ice (100 parts) thereto, sodium carbonate powder (25 parts) was added over 30 minutes to make the pH 6.5. After stirring for 60 minutes, the resulting reaction solution was spray-dried to obtain 86.7 parts of a black powder.

The reactive dye thus obtained had a high solubility in water and dyed cellulosic fibers in black by the common dyeing method using an alkali agent. On the other hand, the foregoing reaction solution was cooled to 0° to 5° C. before spray drying and filtered to remove deposited sodium sulfate. The filtrate was spray dried to obtain 70.9 parts of a black powder. This dye also gave black dyed goods.

EXAMPLE 2

The procedure was carried out in the same manner as in Example 1 except that the amount of the monosodium salt of 1-amino-8-naphthol-3,6-disulfonic acid was changed from 20.6 parts to 21.3 parts. The dye thus obtained gave dyed goods of a slightly redder black than that in Example 1.

The reaction solution after reaction was cooled to 0° C., and deposited sodium sulfate was removed by filtration. Diethylene glycol monobutyl ether (0.39 part) was added to the filtrate. No crystals were deposited from the dye solution even when the solution was left as it was for a long time in a cold area. This solution has a high concentration of dye and has an excellent storage stability as stock solution.

This reactive dye solution dyed cellulosic fibers black by the dyeing method with reactive dye.

EXAMPLES 3 TO 8

In Example 1, the amount of 98% sulfuric acid, reaction temperature and reaction time were changed as shown in the following table, and the change of the weight ratio of the sulfato compound to the acetoxy compound was examined. The results are shown in the following table.

The mixtures of the sulfato compound and the acetoxy compound thus obtained were each diazotized and coupled with the monosodium salt of 1-amino-8-naphthol-3,6-disulfonic acid in the same manner as in Example 1 or 2. The dyes obtained showed a dyeing property similar to that in Example 1 or 2.

| Example | Concentration of sulfuric acid (%) | Molar ratio of sulfuric acid to sulfone | Reaction temperature (°C.) | Reaction time (hr) | Weight ratio Sulfato compound | Weight ratio Acetoxy compound |
|---|---|---|---|---|---|---|
| 3 | 98 | 2.85 | 100–105 | 9 | 49.5 | 50.5 |
| 4 | 98 | 3.72 | " | 9 | 56 | 40 |
| 5 | 90 | 3.10 | " | 7 | 44 | 56 |
| 6 | 95 | 3.10 | " | 7 | 43 | 57 |
| 7 | 100 | 3.10 | " | 6 | 56 | 44 |
| 8 | 98 | 3.10 | 130–135 | 2 | 50 | 50 |

EXAMPLE 9

The treatment of 4-acetylaminophenyl-$\beta$-hydroxyethylsulfone with 98% sulfuric acid was carried out in the same manner as in Example 1 except that nitrogen gas was passed through the mixture when the mixture was kept at 100° to 105° C. for 8 hours with stirring. Thus, a mixture of sulfato compound 65% by weight and acetoxy compound 35% by weight was obtained. In the same manner as in Example 1, this mixture was diazotized and coupled with the monosodium salt of 1-amino-8-naphthol-3,6-disulfonic acid, and the resulting reaction solution was then treated. The dye thus obtained showed the same dyeing performance as that in Example 1.

COMPARATIVE EXAMPLE

The excellent performances of the present dye compositions will be shown in comparison with the dye described in the literature. In the following tables, the dyes to be tested, A, B, C, D and E, were prepared as follows:

A: Diazotization, coupling and spray drying were carried out in the same manner as in Example 1 except that 4-aminophenyl-$\beta$-sulfatoethylsulfone was used as a diazo component.

B: According to Example 1

C: According to Example 2

D: According to Example 9

E: According to Example 61 in U.S. Pat. No. 3,114,754.

(1) Dye composition

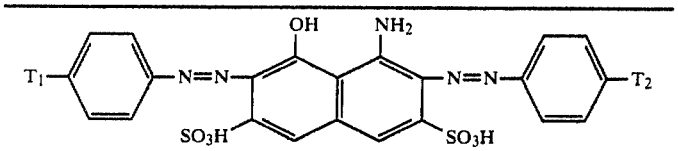

| Component Dye | | Dye | | | |
|---|---|---|---|---|---|
| $T_1$ | $T_2$ | A | B | C | D |
| $-SO_2C_2H_4OSO_3H$ | $-SO_2C_2H_4OSO_3H$ | 77% | 22% | 22% | 45% |
| $-SO_2CH=CH_2$ | $-SO_2CH=CH_2$ | 2 | 2 | 1 | 2 |
| $-SO_2C_2H_4OCOCH_3$ | $-SO_2C_2H_4OCOCH_3$ | 0 | 19 | 17 | 10 |
| $T_1$ or $T_2$ | $T_2$ or $T_1$ | | | | |
| $-SO_2C_2H_4OSO_3H$ | $-SO_2CH=CH_2$ | 20 | 12 | 15 | 19 |
| $-SO_2C_2H_4OSO_3H$ | $-SO_2C_2H_4OH$ | — | 4 | 3 | 3 |
| $-SO_2CH=CH_2$ | $-SO_2C_2H_4OH$ | 1 | 7 | 8 | 5 |
| $-SO_2C_2H_4OCOCH_3$ | $-SO_2C_2H_4OSO_3$ | 0 | 25 | 24 | 11 |
| $-SO_2C_2H_4OCOCH_3$ | $-SO_2CH=CH_2$ | 0 | 9 | 10 | 5 |

(2) Solubility

| Dye | A | B | C | D | E |
|---|---|---|---|---|---|
| Solubility | 450 g/l | ≧ 600 g/l | ≧ 600 g/l | ≧ 600 g/l | 80 g/l |

(3) Dyeing test

Each numerical value in the following tables means a relative depth of each dyed goods to the depth (evaluated as 100) of standard dyed goods which was obtained using the dye A under the same dyeing conditions as those of each dye to be compared.

(i) Dip dying

| | | (i) Dip dyeing | | | | |
|---|---|---|---|---|---|---|
| Material to be dyed | Dyeing temperature (°C.) | Dyeing concentration (% O.W.F.) | Dye B | C | D | E |
| | 40 | 1.0 | 105 | 105 | 104 | — |
| | | 4.0 | 106 | 106 | 105 | — |
| | 50 | 1.0 | 105 | 105 | 105 | 70 |
| | | 4.0 | 106 | 107 | 106 | 60–70 |
| Mercerized cotton | | 8.0 | 108 | 109 | 107 | 60–70 |
| | 60 | 1.0 | 106 | 106 | 106 | — |
| | | 4.0 | 108 | 108 | 108 | — |
| | 70 | 1.0 | 106 | 106 | — | — |
| | | 4.0 | 108 | 109 | — | — |
| | 80 | 1.0 | 106 | 107 | — | — |
| | | 4.0 | 108 | 109 | — | — |
| Unmercerized cotton | 50 | 1.0 | 104 | 104 | 104 | — |
| | | 4.0 | 106 | 106 | 106 | — |
| | | 8.0 | 108 | 108 | 107 | — |

(ii) Printing

| Dyeing method | Dyeing concentration (% o.w.p.) | Dye B | C | D | E |
|---|---|---|---|---|---|
| One-phase printing | 1.0 | 106 | 106 | 106 | — |
| | 4.0 | 108 | 108 | 108 | — |
| | 8.0 | 108 | 108 | 108 | — |
| Two-phase printing | 1.0 | 106 | 106 | 106 | 80 |
| | 4.0 | 108 | 108 | 108 | — |
| | 8.0 | 108 | 108 | 108 | — |

Note:
In the above tables, "—" means "not practiced".

(iii) Cold-pad-batch dyeing

| Dyeing concentration | Dye B | C | D | E |
|---|---|---|---|---|
| 15 g/l (corresponding to 1% o.w.f.) | 100 | 100 | 100 | 95 |
| 59 g/l (corresponding to 4% o.w.f.) | 103 | 103 | 103 | 90 |
| 118 g/l (corresponding to 8% o.w.f.) | 105 | 105 | 104 | 70 |

What is claimed is:

1. A dye composition comprising at least one disazo dye of the formula (I) expressed in the form of a free acid,

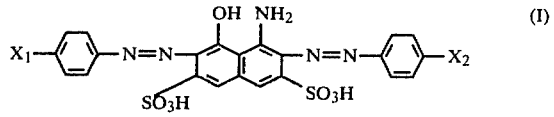

wherein each $X_1$ and $X_2$ is $-SO_2CH_2CH_2OCOCH_3$, $-SO_2CH_2CH_2OSO_3H$ or $-SO_2CH=CH_2$, provided that at least one of $X_1$ and $X_2$ is $-SO_2CH_2CH_2OCOCH_3$, and at least one disazo dye of the formula (II) expressed in the form of a free acid,

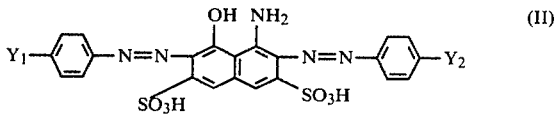

wherein each $Y_1$ and $Y_2$ is $-SO_2CH_2CH_2OSO_3H$, $-SO_2CH=CH_2$ or $-SO_2CH_2CH_2OH$, provided that one of $Y_1$ and $Y_2$ is $-SO_2CH_2CH_2OSO_3H$ or $-SO_2CH=CH_2$.

2. A dye composition according to claim 1, wherein the content of each dye of the formula (I) or (II) in the dye composition is 20 to 80% by weight.

3. A process for producing the dye composition of claim 1, which comprises diazotizing a mixture of 4-aminophenyl-β-sulfatoethylsulfone and 4-aminophenyl-β-acetoxyethylsulfone in a weight ratio of 30 to 70:70 to 30 with a nitrite, and coupling the resulting mixture of diazonium salts with 1-amino-8-naphthol-3,6-disulfonic acid.

4. A process according to claim 3, wherein the mixture of 4-aminophenyl-β-sulfatoethylsulfone and 4-aminophenyl-β-acetoxyethylsulfone is prepared by heating 4-acetylaminophenyl-β-hydroxyethylsulfone at a temperature of 80° to 130° C. with a concentrated sulfuric acid, the amount of sulfuric acid being 2.4 to 3.8 moles per mole of 4-acetylaminophenyl-β-hydroxyethylsulfone.

5. A process according to claim 4, wherein the concentrated sulfuric acid is a 90 to 102% sulfuric acid.

6. A process according to claim 4, wherein the content of 4-aminophenyl-β-acetoxyethylsulfone in the mixture is 30 to 70% by weight.

7. A process according to claim 3, wherein the diazotizing is effected at a low temperature in an acid medium.

8. A process according to claim 3, wherein the coupling is effected at a temperature of $-10°$ to 40° C. in an aqueous medium.

9. A process according to claim 3, wherein the molar ratio of 1-amino-8-naphthol-3,6-disulfonic acid to the mixture of the diazonium salts is 0.45 to 0.55.

10. A dye composition obtained by a process of claim 3.

11. A process for dyeing a natural or regenerated cellulosic fiber, which comprises using a dye composition of claim 1.

12. A natural or regenerated cellulosic fiber dyed by a process of claim 11.

* * * * *